United States Patent
Feuer et al.

(10) Patent No.: US 7,630,636 B1
(45) Date of Patent: Dec. 8, 2009

(54) OPTICAL SWAPPING OF DIGITALLY-ENCODED OPTICAL LABELS

(75) Inventors: Mark David Feuer, Colts Neck, NJ (US); Vincent Anant Vaishampayan, Summit, NJ (US)

(73) Assignee: AT&T Intellectual Property II, L.P., New York, NY (US)

( * ) Notice: Subject to any disclaimer, the term of this patent is extended or adjusted under 35 U.S.C. 154(b) by 786 days.

(21) Appl. No.: 11/283,977

(22) Filed: Nov. 21, 2005

(51) Int. Cl.
*H04J 14/00* (2006.01)
(52) U.S. Cl. .............................. 398/51; 398/54; 398/49
(58) Field of Classification Search .................. 398/51, 398/54, 45, 49, 182, 48
See application file for complete search history.

(56) References Cited
U.S. PATENT DOCUMENTS 6,943,925 B1 * 9/2005 Islam ......................... 359/108
2002/0071152 A1 * 6/2002 Blumenthal ................. 359/123
2004/0033074 A1 * 2/2004 Hsu ............................ 398/51
2005/0180750 A1 * 8/2005 Wada et al. ................... 398/49
2006/0093358 A1 * 5/2006 Park et al. ..................... 398/65
2006/0171721 A1 * 8/2006 Kim et al. .................... 398/187

* cited by examiner

*Primary Examiner*—M. R. Sedighian

(57) ABSTRACT

A method and a device are provided for swapping optical labels in an optical communication network. Optical information, including payload data and label data digitally encoded into the optical information, is received. At least one group of bits within the optical information is selectively inverted to rewrite the label data with new label data without changing the payload data. Each of the at least one group of inverted bits includes at least two bits and all bits of each of the at least one group of inverted bits are contiguous bits.

20 Claims, 4 Drawing Sheets

OPTICAL SWAPPING OF DIGITALLY-ENCODED OPTICAL LABELS

BACKGROUND OF THE INVENTION

1. Field of the Invention

The present invention relates generally to optical networking, and more particularly, to a method and apparatus for optical swapping of digitally-encoded label information within an optical stream or packet.

2. Introduction

Packet networks transport data from a source location to a destination location by organizing the data into self-contained units called packets. Each packet carries its routing information as it passes through a series of routing nodes on its way to the destination location. Each routing node reads the routing information associated with the packet and uses that information to decide the correct path to use to forward the packet. In traditional IP (Internet Protocol) networks, the routing information is made up of individual addresses of source and destination nodes. In more advanced MPLS (Multiprotocol Label Switching) networks, packets are assigned additional labels that group them according to their intermediate or final destinations. This label assignment promotes efficient scaling and quality-of-service assignment in the MPLS networks. In both IP and MPLS networks with optical transport between routing nodes, all packets are converted from optical to electrical form as they enter the routing node and then converted back to optical form as they leave the routing node. Minimization of such Optical-Electronic-Optical (OEO) conversions is a central principle of cost reduction in advanced optical networks. Removing OEO conversions and electronic switching also helps with scaling the routers to massive capacity, since these electronic functions contribute to the buildup of cost, failure rate, and power dissipation in the router nodes.

As a result, Optical Label Switching (OLS) networks are under intensive study as a means of combining the flexibility and statistical multiplexing of electronic IP packet networks with the cost-effectiveness and massive scalability of optical data transport. OLS networks include an optical label (OL) with each packet of payload data, and the OL is read at each routing node to determine the proper switch settings for packet forwarding. OLs may be in-band, sent as headers occupying the first bytes of every packet, but that approach requires expensive photoreceivers capable of operating at full data rate. Thus, OLs are usually sent in a separate out-of-band channel. For flexibility and scaling, it is desirable to be able to change a value of an optical label as it passes through a routing node. This is known as label swapping.

The value of OLS networks is greatly enhanced when they can carry multiple optical packets simultaneously. Such a capability can be implemented through the use of wavelength division multiplexing (WDM), in which each packet is assigned to a specific wavelength of light. Using WDM, multiple simultaneous packets are combined at the source with an arrangement of optical wavelength filters called a wavelength multiplexer (MUX), and re-separated before detection at the destination with a reciprocal arrangement of optical filters called a wavelength demultiplexer (DMUX). WDM presents OLS networks with an additional challenge of reading multiple OLs that are simultaneously present at any given point in the network. For in-band labels, the straightforward solution is to follow a DMUX with a parallel array of label receivers, but this becomes expensive as the wavelength count becomes large. Alternatively, one might place a tunable wavelength selection filter before a shared label receiver, but this would reduce packet throughput and demand extremely complex network synchronization.

Various of out-of-band OL technologies have been proposed for WDM OLS networks. Some use dedicated label wavelengths for each packet wavelength, reducing spectral efficiency of the networks. Others rely on orthogonal modulation formats, such as optical phase shift keying (PSK) for labels in combination with amplitude shift keying (ASK) for payloads. Although this approach can reduce the number of full-rate OEO conversions and enable optical label switching, it often has flaws such as complex modulation formats, crosstalk caused by optical impairments, or high cost.

Another key element of optical packet networks is the all-optical regenerator. As packets pass through optical transmission lines that may be hundreds or thousands of km long, they accumulate impairments that degrade the quality of the pulses that represent data bits. If not corrected, these impairments will cause bit errors and corrupt the packets. Regenerators are non-linear signal processing subsystems that restore the correct amplitude, pulse shape, and timing to each bit of the packet. To minimize OEO conversions, all-optical regenerators have been developed, and used to demonstrate error-free data transmission up to 1 million km. All-optical regenerators can be classed as non-inverting or inverting, depending on whether or not 1s are exchanged with 0s in the regeneration process. Because the inversion affects all bits in exactly the same way, the original data can be easily recovered by an additional inversion process at the destination.

Optical labels can also be useful in circuit-switched networks, especially those capable of dynamically re-routing signals on a wavelength-by-wavelength basis.

Thus, there is a need for a practical method of encoding optical labels carrying routing information or other information in optical packet networks and also for a method of optical label swapping applicable to both packet-switched and circuit-switched optical networks.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

In a first aspect of the invention, a method for swapping optical labels in an optical communication network is provided. Optical information, including payload data and label data digitally encoded into the optical information, is received. At least one group of bits within the optical information is selectively inverted to rewrite the label data with new label data without changing the payload data. Each of the at least one group of inverted bits includes at least two bits and all bits of each of the at least one group of inverted bits are contiguous bits.

In a second aspect of the invention, a device for swapping optical labels in an optical network is provided. The device includes a label processing component and a selective inversion device. The label processing component is arranged to receive first optical label data and second optical label data to produce a difference signal representing a difference of bit settings between the first optical label data and the second optical label data. The selective inversion device is arranged to receive an optical signal and the difference signal and to selectively invert groups of at least two contiguous bits in the optical signal such that the first optical label data encoded within the optical signal is rewritten to be equal to the second optical label data without changing payload data represented by the encoded payload data in the optical signal.

In a third aspect of the invention, a device for receiving an optical signal in an optical network is provided. The device includes first label data and second label data to produce a difference signal representing a difference of bit settings between the first label data and the second label data, and means for receiving an optical signal and the difference signal and for selectively inverting groups of at least two contiguous bits in the optical signal such that the received first label data is rewritten to be equal to the second label data without changing payload data represented by the encoded payload data in the optical signal.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Introduction

U.S. patent application Ser. No. 11/101,778, filed on Apr. 8, 2005 and incorporated by reference herein in its entirety, introduces a new digital encoding process optimized for path tracing in circuit-switched optical networks with minimal OEO conversion. Using complementary constant weight codes, this encoding process may embed an auxiliary channel with management information into high-speed payload data in such a way that the management information can be extracted by low cost photoreceivers without a need to process, or even detect, the high-speed payload data. For WDM networks, a layer of Code Division Multiple Access (CDMA) coding may be added to enable a single auxiliary receiver to capture and decode individual label data from multiple wavelengths simultaneously. For more advanced reconfigurable networks, it may be desirable to rewrite optical labels without OEO conversion at network elements such as wavelength converters or all-optical regenerators.

U.S. patent application Ser. No. 11/283,978, entitled "DIGITAL ENCODING OF LABELS FOR OPTICAL PACKET NETWORKS", Inventors: Mark D. Feuer and Vinay Vaishampayan, filed on the same date as the present application and herein incorporated by reference in its entirety, discloses a digital encoding and decoding process, similar to that described in U.S. patent application Ser. No. 11/101,778, but for use with optical packet networks.

Exemplary Optical Network

Figure 1:
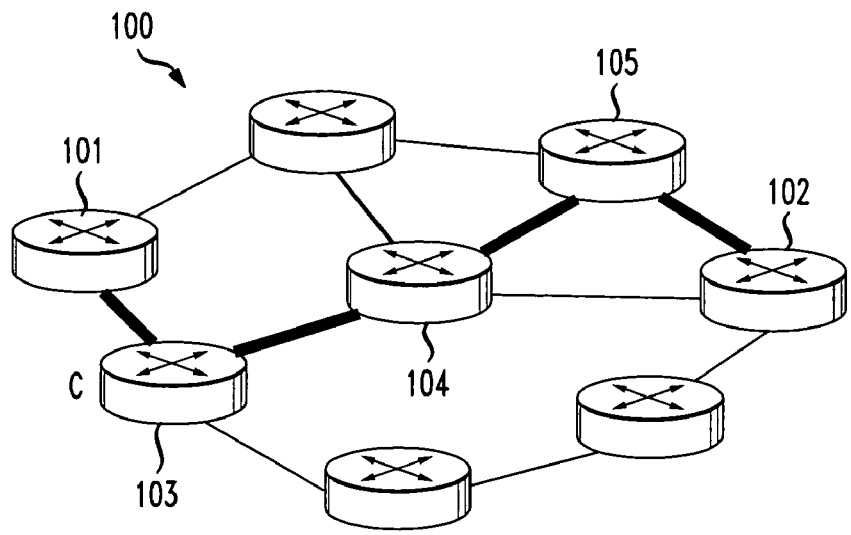
FIG. 1 illustrates an exemplary optical network in which embodiments consistent with principles of the invention may be implemented.

FIG. 1 illustrates an exemplary optical network 100 which may include implementations consistent with the principles of the invention. For each network path, one node may be designated as a source node 101, one or more nodes may be designated as intermediate nodes, 103, 104 and 105, and one or more nodes may be designated as destination nodes 102. Each node should have a connection to at least one other node and there should be a path or route between any source node 101 and destination node 102.

Exemplary Encoding Implementations

Figure 2A:
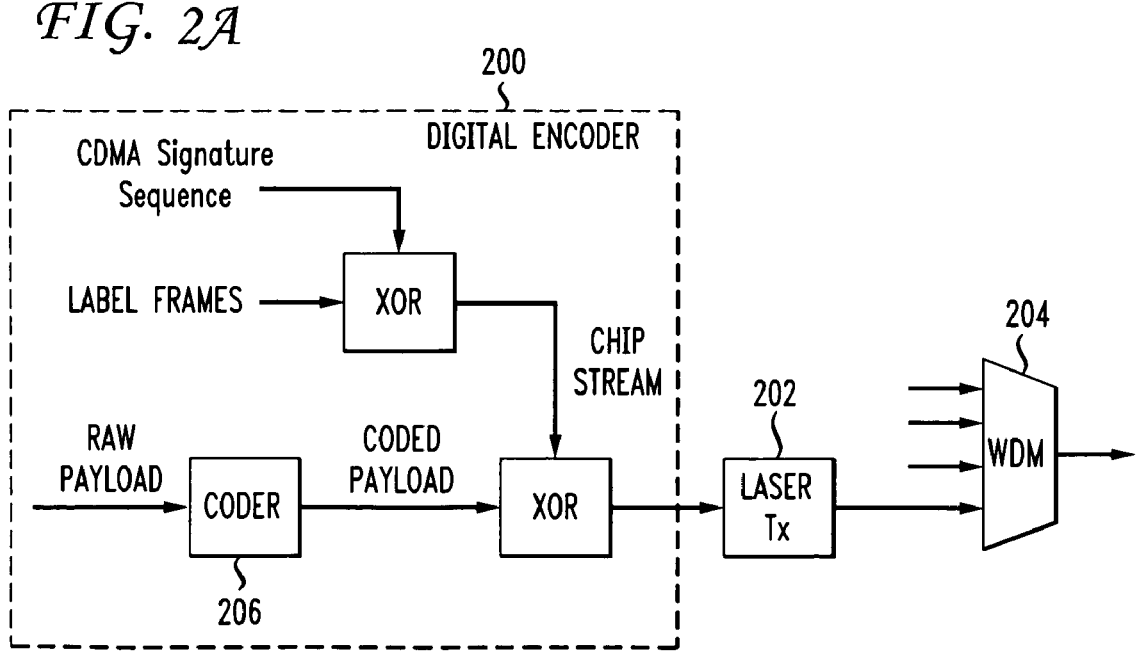
FIG. 2A illustrates an exemplary apparatus for encoding and transmitting optical data consistent with principles of the invention.

FIG. 2A illustrates an exemplary apparatus that may be included in source nodes 101 of optical network 100. The apparatus may include a digital encoder 200 and a laser transmitter 202. In some implementations consistent with the principles of the invention, the apparatus may include a wave division multiplexer (WDM) 204.

Digital encoder 200 may include coder 206, which may encode each group of K bits of raw payload data into a block of N bits of coded payload data, where K<N. Digital encoder 200 may employ a complementary constant-weight code (CCWC) with $2^{K+1}$ codewords. Half of the codewords may have a constant weight of W, where W<N/2, and a second half of the codewords may have a constant weight of N-W, obtained by inverting or complementing each codeword having a constant weight of W. Each group of K bits of the raw payload data may always be encoded by coder 206 into a block of N bits of coded payload data by using a codeword of constant weight W. Thus, the weight of the blocks of coded payload data may be uniform, and the average power may be constant.

A label message may include routing information for an optical packet or other useful information. In some implementations consistent with the principles of the invention, each label message may be spread by a signature sequence such as, for example, a CDMA signature sequence, by passing the label message and the signature sequence through an exclusive OR (XOR) gate, to produce binary chip data. The rate of the produced binary chip data is the faster rate of the label data and the signature sequence. For example, the label data may have a rate of about 50 kilobits per second and the signature sequence may have a rate of about 10 Megabits per second. Thus, the resulting binary chip data may have a rate of about 10 Megabits per second. Further, because of the differences in data rates between the label message and the signature sequence, each bit of the label message, when combined with the signature sequence may be XOR'ed with many bits of the signature sequence, thereby producing many bits of binary chip data. The number of chips of binary chip data that result from combining one label message bit with the signature sequence is C.

Next, the blocks of coded payload data may be XOR'ed with the binary chip data to produce coded composite data blocks. This XOR process may replace some of the blocks with their complements, producing coded composite data whose average power shows a binary modulation according to the chip stream, with effective modulation index (1−2W/N). For a single label message frame, the composite data may have a length of C chips of B data blocks each, where each block comprises N bits of composite data. In one specific implementation, N may be 1,024, B may be 1, and C may be 200, thereby making the label frame size in this implementation 204,800 bits.

The CDMA layer may provide a mechanism for many packets on different wavelengths in a WDM network to share a single all-wavelength label receiver. The CDMA-based spectrum spreading may also contribute to a longer averaging interval that enhances immunity to optical amplifier noise. The fully-coded composite data, combining both payload data and label frames in a single binary sequence, may be fed to a standard optical transmitter such as, for example, laser transmitter 202, to produce an on-off-keyed (OOK) optical signal that can be combined with similarly coded optical signals at other wavelengths by a wave division multiplexer (WDM) 204 for transmission through the optical packet network.

Although the above-described implementation may use constant-weight codes, in other implementations other types of complementary codes may be used. Further, the CDMA layer is optional and may be replaced by a different multiple access strategy, such as Orthogonal Frequency Division Multiple Access, or omitted entirely in non-WDM networks. In alternative implementations consistent with the principles of the invention, two complementary code blocks may represent each pattern of payload bits, and the label frame may be encoded into the weight of these two alternative code blocks. Also, in single-wavelength implementations, the coded payload data may be XOR'd with the bits of the label data instead of with the chip stream. However, because the payload data rate is much higher than the label data rate, each bit of label data may be XOR'ed with many bits of coded payload data.

Figure 2B:
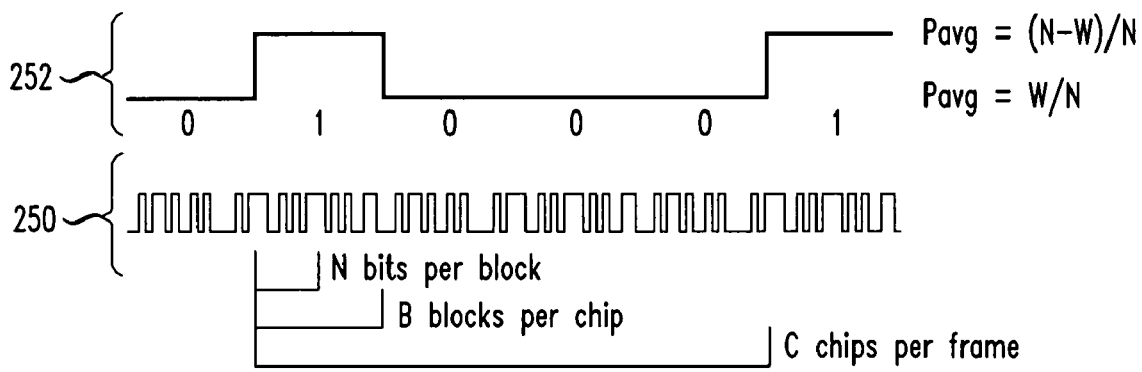
FIG. 2B shows aspects of exemplary encoding of coded payload data with a chip stream.

FIG. 2B illustrates encoding of a portion of chip data onto a portion of coded payload data to produce coded composite data 250 in one implementation consistent with the principles of the invention. Coded composite data 250 is shown as having N bits per block, B blocks per chip, and C chips per frame. Chip data portion 252 is shown as chips 010001, which are to be encoded onto the portion of the coded payload data to produce coded composite data 250. In the example of FIG. 2B, each chip of chip data 252 may be encoded into N*B bits of coded composite data 250. In one implementation, each 0 chip of chip data 252 is encoded over B blocks of N bits of coded payload data producing N*B bits of coded composite data 250 in which each block of N bits has an average power of W/N; and each 1 chip of chip data 252 is encoded over B blocks of N bits of coded payload data producing N*B bits of coded composite data 250 in which each block of N bits has an average power of (N−W)/N. Thus, chip data 252 may be recovered from coded composite data 250 based on the average power of B blocks of N bits each.

Although the above example describes each 0 chip of chip data 252 being encoded into coded composite data 250 as a group of blocks having an average power of W/N, and describes each 1 chip of chip data 252 being encoded into coded composite data 250 as a group of blocks having an average power of (N−W)/N, each 0 chip of chip data 252 may be encoded into a group of blocks having an average power of (N−W)/N, and each 1 chip of chip data 252 may be encoded into a group of blocks having an average power of W/N.

Figure 3:
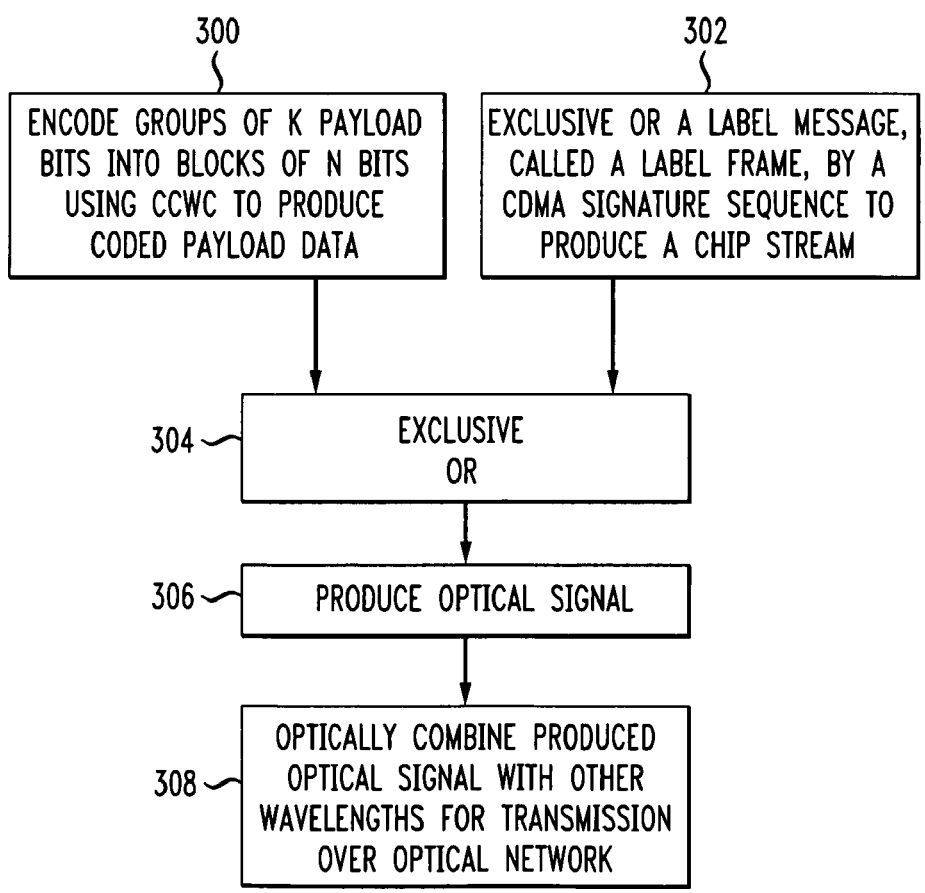
FIG. 3 is a flowchart that describes an exemplary encoding process consistent with the principles of the invention.

FIG. 3 is a flowchart that helps to illustrate an exemplary process that may be used to encode label data into optical signals in an implementation consistent with the principles of the invention. Groups of Id payload bits may be encoded, via coder 206, into N bit blocks of coded payload data using codewords of a CCWC code having a constant weight of W (act 300). In parallel, information from a label message may be XOR'ed with a signature sequence such as, for example, a CDMA signature sequence, to produce chip data having a rate that may be an integer multiple of the label rate (act 302). Next, each group of B blocks of N bits of the coded payload data may be XOR'ed with one chip of the chip data to produce a portion of coded composite data (act 304). Thus, a 1 bit of the chip data may invert N*B bits of coded payload data, having a constant weight of W*B, to produce N*B bits of the coded composite data having a constant weight of (N−W)*B. An optical transmitter, such as laser transmitter 202, may produce an optical signal of a particular wavelength, corresponding to the coded composite data (act 306). One or more produced optical signals of other wavelengths may be optically combined with the coded composite data via WDM 204 to be transmitted as optical signals via an optical network (act 308).

Exemplary Decoding Implementations

Figure 4:
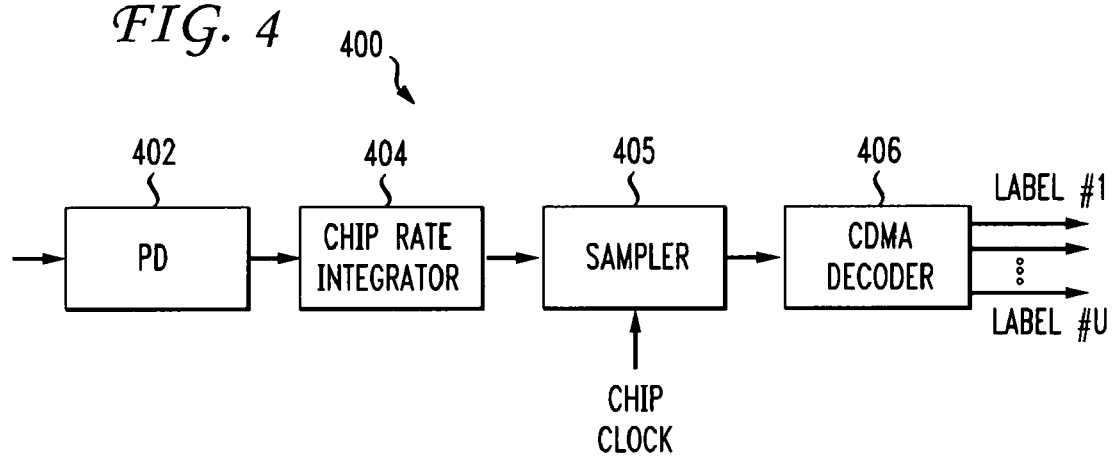
FIG. 4 illustrates an exemplary label receiver, consistent with the principles of the invention, for detecting a composite optical signal and recovering label data from the composite optical signal.

FIG. 4 illustrates an exemplary label receiver 400 for detecting and decoding label frames encoded onto optical packets in an optical packet network by an apparatus such as, for example, the exemplary apparatus of FIG. 2A. Label receiver 400 may be included in intermediate nodes such as, for example, routing nodes of an optical network. Label receiver 400 may include a photodiode (PD) 402 such as, for example, a slow PD, a chip rate integrator 404, a sampler 405 and a decoder 406 such as, for example, a CDMA decoder.

Multiple wavelengths may impinge on PD 402, which is capable of responding at the chip rate. That is, PD 402 may have a maximum frequency of operation that is less than one-half of the rate of received composite data. The resulting electrical signal is made up of a superposition of chip data from the various wavelengths. Chip rate integrator 404 and sampler 405 may perform sampling such as, for example, integrate-and-dump sampling, clocked to the (synchronous) chip data to assure complete rejection of the payload data. Decoder 406 may operate on analog chip samples from sampler 405 to recover individual optical labels.

Due to simplicity of the label receiver design, the digital label encoding method can achieve significant cost benefits over a system in which in-band labels are incorporated into conventional packet headers. A conventional packet scheme requires multiple 10 Gb/s receivers, one for each wavelength. In contrast, the new label encoding method may use a single photodiode and accompanying circuitry that is significantly less expensive, operating at ~10 Mb/s. Also, the low-speed chip data can be received at a lower optical power, allowing operation from a low-loss optical tap and eliminating a need for additional optical amplifiers. Finally, a CDMA layer may allow simultaneous reception of labels attached to multiple wavelengths. Digital label encoding also offers an enhanced degree of data privacy. Depending on the throughput demanded for label data, it is possible to operate the apparatus at a power level so low that photon shot noise would obscure the payload information.

Exemplary Label Swapping Device

Figure 5:
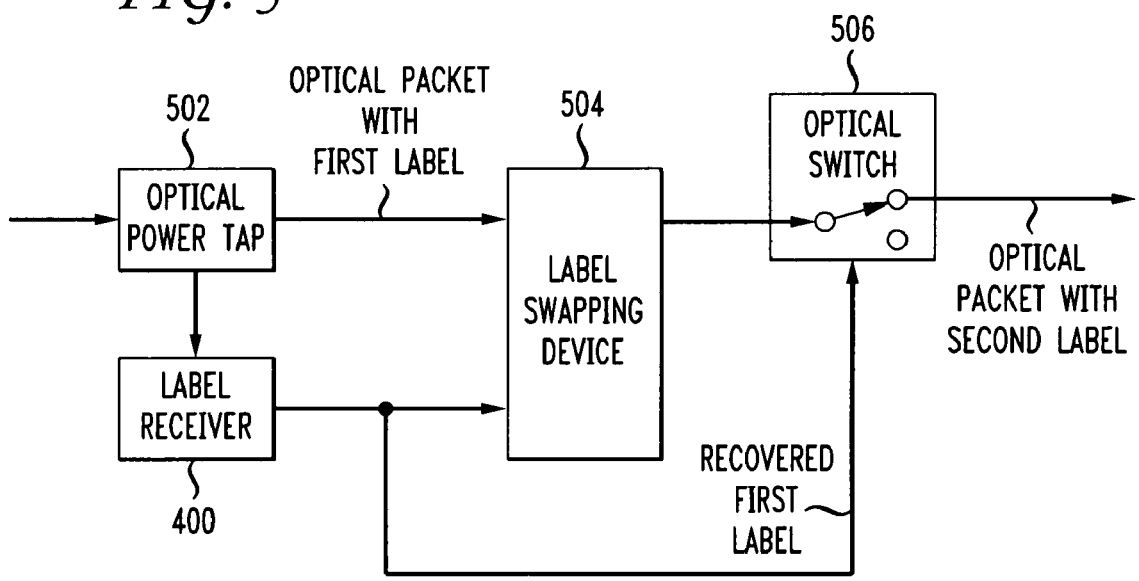
FIG. 5 is a functional block diagram that illustrates an optical network routing node incorporating an exemplary label swapping device.

FIG. 5 illustrates an optical routing node incorporating an exemplary label swapping device 504 for use in an optical network. The optical routing node may include an optical power tap 502, label receiver 400, a label swapping device 504 and an optical switch 506.

Optical power tap 502 may extract a fraction of the optical signal from the network. The optical signal may include composite data having encoded payload data and encoded label data such that the encoded label data may be superposed with respect to the encoded payload data as described previously. The tapped fraction of the optical signal may be passed to label receiver 400 for recovery of the label data. The recovered label data may be passed to label swapping device 504 and to optical switch 506. The untapped part of the optical signal may be passed to label swapping device 504 for selectively inverting groups of contiguous bits. The label data included in the encoded label data may include routing information or other useful information. Label swapping device 504 may output an optical data stream having swapped or rewritten label data. Optical switch 506 may receive the output optical data stream, may change the switch settings based on the label data, and may forward the optical signal toward its destination.

The optical signal in FIG. 5 may consist of a single wavelength or multiple wavelengths, and if it consists of multiple wavelengths, each wavelength may have its own payload data and its own label data. If the optical signal is a multi-wavelength signal, both the label swapping device 504 and the optical switch 506 may operate on each wavelength independently, to relabel each wavelength and forward it towards its destination. In one implementation of a single wavelength node, label receiver 400 may not include CDMA decoder 406. Instead, a single label may be output from sampler 405.

Figure 6:
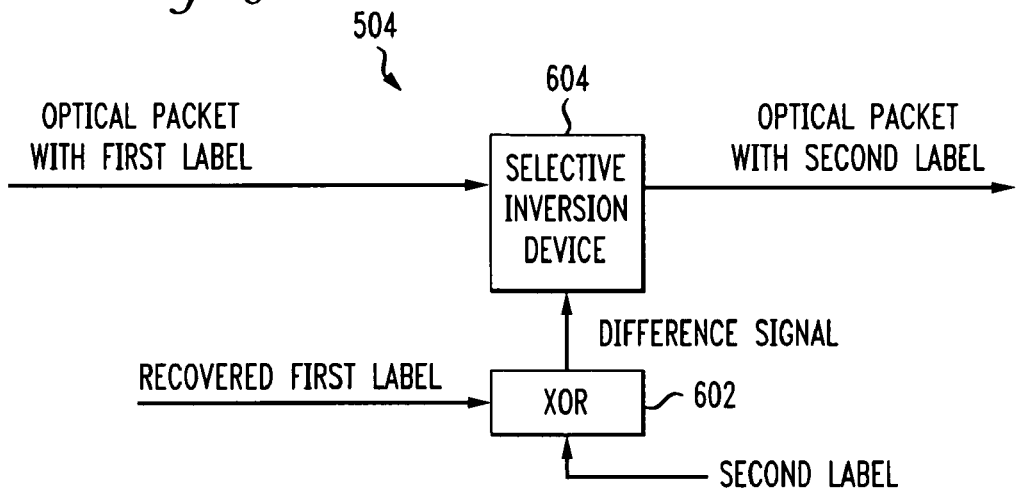
FIG. 6 is a functional block diagram that illustrates an exemplary label swapping device for swapping optical labels in a single wavelength optical network.

FIG. 6 illustrates a detailed view of an implementation of label swapping device 504 for a single-wavelength optical network. Label swapping device 504 may include selective inversion device 604 and XOR device 602.

The single recovered label may be provided to a label processor, which in this implementation may be XOR device 602. XOR device 602 may also be provided with a second label, which may be a desired new label for the optical packet. Label processor, or XOR device 602, may output a difference signal, which may indicate the bit differences between the first label and the second label. The one bits of the difference signal may indicate the groups of bits in the optical signal that are to be selectively inverted.

Selective inversion device 604 may include an all-optical regenerator or an interferometric device. The interferometric device may have at least one optical phase shift adjustment mechanism. In one implementation consistent with the principles of the invention, selective inversion device 604 may selectively invert one or more label frames or groups of N×B×C bits of encoded payload data based on the bit pattern of the difference signal, to effectively invert selected bits or frames of the encoded label data superposed with respect to the encoded payload data. Selective inversion device 604 may then output the optical signal with the new label data.

FIG. 6 may be modified to be a label swapping device operating in a multi-wavelength network by making selective inversion device 604 capable of performing its function on multiple wavelengths simultaneously, and by generalizing the first label data, second label data, and XOR 602 to operate with multiple parallel channels, one for each wavelength.

Figure 7:
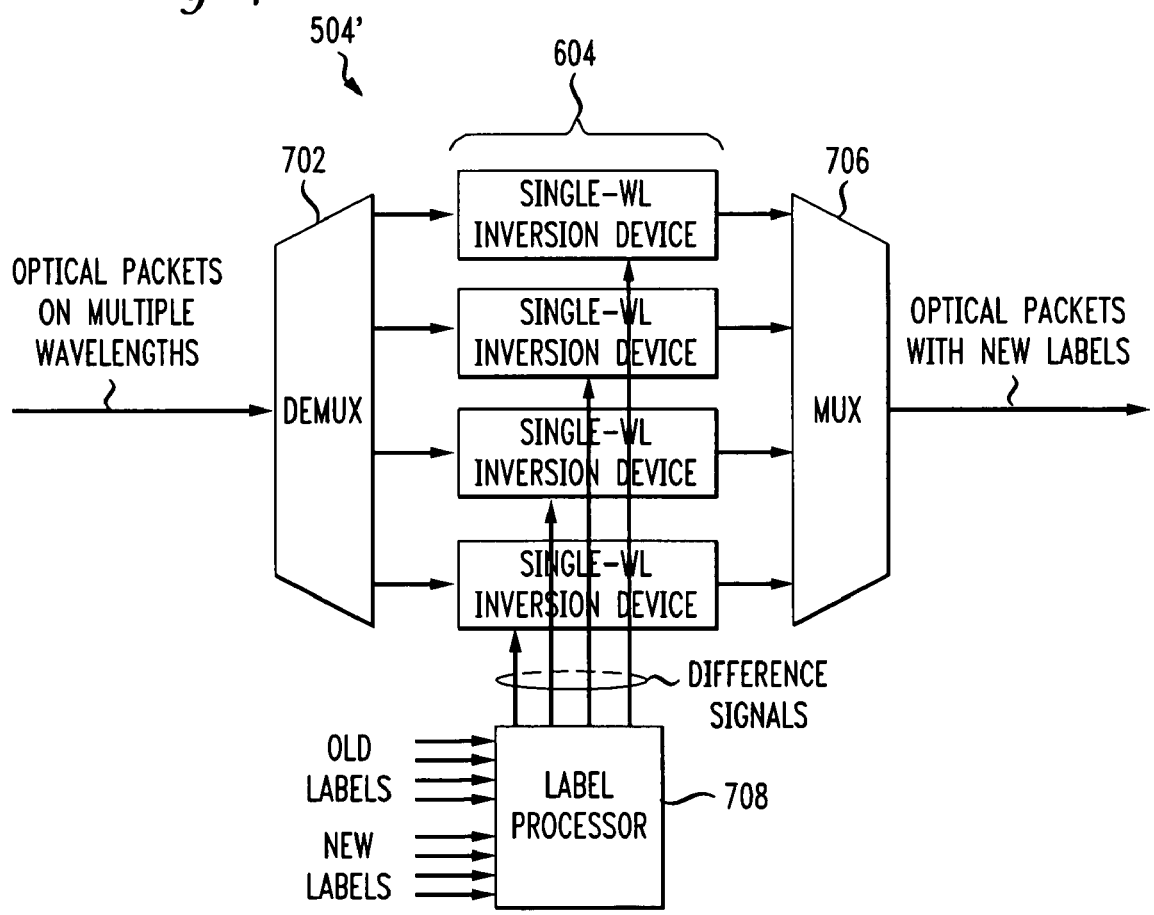
FIG. 7 is a functional block diagram that illustrates an exemplary label swapping device for swapping optical labels in a multiple wavelength optical network.

FIG. 7 illustrates an exemplary label swapping device 504' which may be used in implementations consistent with the principles of the invention that receive optical signals including multiple wavelengths of light. Label swapping device 504' may include label processor 708, wavelength demultiplexer (WDM) 702, a group of single wavelength inversion devices 604, and wavelength multiplexer (MUX) 706.

Label swapping device 504' may receive an optical signal having multiple wavelengths. It may also receive recovered label data for each wavelength, as previously described with respect to FIG. 4. In one implementation consistent with the principles of the invention, label processor 708 may include a group of XOR devices, one for each wavelength. Label receiver 400 (not shown in FIG. 7) may provide the multiple labels to label processor 708. Label processor 708 may also be provided with new label data. Label processor 708 may XOR each of the received labels with a respective new label, thereby producing a difference signal for each wavelength. The difference signal may be a bit pattern indicating which groups of bits in the optical wavelength signal are to be inverted such that the resulting label is equal to the new label.

DMUX 702 may receive the multiple wavelength optical signal and may demultiplex the signal into a respective signal for each wavelength. The respective signal may be input to a respective one of the selective inversion devices 604, which may also receive a respective one of the difference signals. Each selective inversion device 604 may selectively invert groups of bits corresponding to a label frame or frames, according to the respective difference signal, to swap or rewrite the respective label to a desired new label value. Each selective inversion device 604 may output a single wavelength optical signal. Each single wavelength optical signal may then be multiplexed by MUX 706 to produce a multiple wavelength optical signal with new labels.

CONCLUSION

Although the above description may contain specific details, they should not be construed as limiting the claims in any way. Other configurations of the described embodiments of the invention are part of the scope of this invention. For example, although the above embodiments are described as producing an OOK optical signal, other keying methods may be used such as, for example, amplitude shift keying (ASK) or other methods. Further, implementations consistent with the principles of the invention may have more or fewer acts than as described, or may implement acts in a different order than as shown. Accordingly, the appended claims and their legal equivalents should only define the invention, rather than any specific examples given.

We claim:

1. A method for use in a device having a processor for swapping optical labels in an optical communication network, the method causing the device to perform steps comprising:

receiving optical information including payload data and label data digitally encoded into the received optical information by performing sampling on a detected composite optical signal, clocked to a multiple of a rate of the label data, to recover data based, at least partly, on the label data; and selectively inverting via the processor at least one group of bits within the optical information to rewrite the label data with new label data without changing the payload data, wherein each of the at least one group of inverted bits comprises at least two bits, and all bits of each of the at least one group of inverted bits are contiguous bits.

2. The method of claim 1, wherein the received optical information is formed by:

encoding groups of K raw payload bits into blocks of N bits by using a complementary code having two blocks of differing weight to represent each possible group of K raw payload bits, wherein the two blocks are complements of each other; and choosing among the two blocks to incorporate the label data in the optical information.

3. The method of claim 2, wherein each group of bits selectively inverted corresponds to an integral number of complete blocks of the complementary code.

4. The method of claim 1, wherein selectively inverting at least one group of bits within the optical information to rewrite the label data with new label data without changing the payload data further comprises:

determining a difference between label messages of the received label data and the new label data; and selectively inverting the at least one group of bits of the optical information according to the determined difference between the label messages to change the label data digitally encoded within the optical information such that the changed label data is equal to the new label data.

5. The method of claim 1, wherein receiving optical information including payload data and label data digitally encoded into the received optical information further comprises:

decoding the recovered data to recover the label data from the received optical information.

6. The method of claim 1, wherein the label data includes routing information.

7. The method of claim 1, wherein selectively inverting at least one group of bits within the optical information is performed by using an all-optical regenerator or an interferometric device.

8. The method of claim 7, wherein the interferometric device has at least one optical phase shift adjustment mechanism.

9. A device for swapping optical labels in an optical network, the device comprising:

a label processing component to receive first optical label data and second optical label data to produce a difference signal representing a difference of bit settings between the first optical label data and the second optical label data; and a selective inversion device arranged to receive an optical signal and the difference signal and to selectively invert groups of at least two contiguous bits in the optical signal, such that the first optical label data encoded within the optical signal is rewritten to be equal to the second optical label data without changing payload data represented by the encoded payload data in the optical signal.

10. The device of claim 9, further comprising:

an optical tap and a label receiver arranged to recover the first optical label data included in the received optical signal and to pass the recovered first optical label data to the label processing component.

11. The device of claim 10, wherein the label receiver comprises:

a photodiode to detect the optical signal and having a maximum frequency of operation that is less than one-half of a rate of the received encoded payload data; and sampling circuitry arranged to perform sampling on the detected optical signal, clocked to a multiple of a rate of the label data, to produce sampled data.

12. The device of claim 11, further comprising a decoder arranged to decode the sampled data to produce the label data.

13. The device of claim 12, wherein the decoder is a CDMA decoder.

14. The device of claim 9, wherein:

the encoded payload data is block-encoded with a complementary code having two blocks of differing weight to represent each possible group of K raw payload bits, wherein the two blocks are complements of each other; and the 1 bits and the 0 bits of the first optical label data are incorporated into the optical signal by choosing among the two blocks.

15. The device of claim 9, wherein the first optical label data includes routing information.

16. The device of claim 9, further comprising:

a plurality of selective inversion devices;

a demultiplexer arranged to demultiplex the received optical signal into a plurality of demultiplexed optical signals and provide each of the demultiplexed optical signals to a respective one of a plurality of selective inversion devices; and a multiplexer arranged to receive an optical signal with selectively inverted bit groups from each of the plurality of selective inversion devices and combine the plurality of optical signals into one optical signal.

17. The device of claim 16, wherein:

the multiplexer is a wavelength division multiplexer arranged to combine optical signals of different wavelengths into the one optical signal, and the demultiplexer is a wavelength division demultiplexer arranged to split the received optical signal having multiple wavelengths into a plurality of optical signals, each of the plurality of optical signals having a different wavelength.

18. The device of claim 9, wherein:

the selective inversion device is arranged to operate on an optical signal comprising at least two wavelength channels simultaneously.

19. The device of claim 9, wherein:

the selective inversion device comprises an all-optical regenerator or an interferometric device to selectively invert the groups of at least two contiguous bits of the optical signal.

20. A device for swapping optical labels in an optical network, the device comprising:

means for receiving a first label data and a second label data to produce a difference signal representing a difference of bit settings between the first label data and the second label data; and means for receiving an optical signal and the difference signal and for selectively inverting groups of at least two contiguous bits in the optical signal such that the received first label data is rewritten to be equal to the second label data without changing payload data represented by the encoded payload data in the optical signal.

* * * * *

UNITED STATES PATENT AND TRADEMARK OFFICE
CERTIFICATE OF CORRECTION

| | | |
|---|---|---|
| PATENT NO. | : 7,630,636 B1 | Page 1 of 1 |
| APPLICATION NO. | : 11/283977 | |
| DATED | : December 8, 2009 | |
| INVENTOR(S) | : Mark David Feuer and Vinay Anant Vaishampayan | |

It is certified that error appears in the above-identified patent and that said Letters Patent is hereby corrected as shown below:

On the Title Page, item (75)

The second inventor's first name, "Vincent" should be "Vinay".

Signed and Sealed this

Twenty-second Day of February, 2011

David J. Kappos
*Director of the United States Patent and Trademark Office*